(12) United States Patent
Clothier

(10) Patent No.: US 9,126,170 B2
(45) Date of Patent: Sep. 8, 2015

(54) MICROWIRE-CONTROLLED AUTOCLAVE AND METHOD

(75) Inventor: Brian L. Clothier, Wichita, KS (US)

(73) Assignee: TSI Technologies LLC, Wichita, KS (US)

( * ) Notice: Subject to any disclaimer, the term of this patent is extended or adjusted under 35 U.S.C. 154(b) by 179 days.

(21) Appl. No.: 13/456,448

(22) Filed: Apr. 26, 2012

(65) Prior Publication Data

US 2012/0205837 A1 Aug. 16, 2012

Related U.S. Application Data

(62) Division of application No. 12/018,100, filed on Jan. 22, 2008, now Pat. No. 8,192,080.

(60) Provisional application No. 60/881,866, filed on Jan. 23, 2007, provisional application No. 60/919,345, filed on Mar. 22, 2007.

(51) Int. Cl.
*G01K 7/36* (2006.01)
*B01J 3/04* (2006.01)
*B29C 35/02* (2006.01)
*B29C 73/30* (2006.01)
*B29C 73/34* (2006.01)
*F27B 17/00* (2006.01)
*G05D 23/26* (2006.01)
*B29C 35/08* (2006.01)

(52) U.S. Cl.
CPC ............... *B01J 3/04* (2013.01); *B29C 35/0227* (2013.01); *B29C 35/0288* (2013.01); *B29C 73/30* (2013.01); *B29C 73/34* (2013.01); *F27B 17/00* (2013.01); *G05D 23/26* (2013.01); *B29C 2035/0811* (2013.01)

(58) Field of Classification Search
CPC ....................................... G01K 7/36
USPC ......... 374/120, 163, 183, 184, 100, 177, 141, 374/208; 324/219, 224, 225, 494, 226, 228, 324/244, 260, 263, 200, 201; 340/572.5, 340/572.4, 572.1, 584, 870.17; 219/600, 219/494, 635, 9; 422/26, 295, 119, 121, 422/125; 148/566, 567, 568; 116/216; 702/130

See application file for complete search history.

(56) References Cited

U.S. PATENT DOCUMENTS 6,208,253 B1 * 3/2001 Fletcher et al. ............... 340/584
7,816,632 B2 * 10/2010 Bourke et al. ................ 219/635
8,258,441 B2 * 9/2012 Clothier ........................ 219/494

FOREIGN PATENT DOCUMENTS

SU 494710 A * 3/1976
SU 832505 B * 5/1981

*Primary Examiner* — Gail Kaplan Verbitsky
(74) *Attorney, Agent, or Firm* — Hovey Williams LLP

(57) ABSTRACT

Improved treatment apparatus (120, 152) is provided for the treatment (e.g., molding, heating and/or curing) of objects such as parts or part precursors (148, 170) including wireless detection of a temperature parameter related to the objects during treatment thereof. The objects include associated microwire-type sensors (150, 174) which have characteristic re-magnetization responses under the influence of applied, alternating magnetic fields. The apparatus (120, 152) have treatment chambers (122, 153) sized to hold the objects to be treated, with one or more antennas (132, 124, 166) proximal to such objects and operable to generate interrogating alternating magnetic fields and to detect the responses of the sensors (150, 174). The detected temperature parameter information is used by an apparatus controller (146) to maintain desired ambient conditions within the treatment chamber (122, 153).

3 Claims, 6 Drawing Sheets

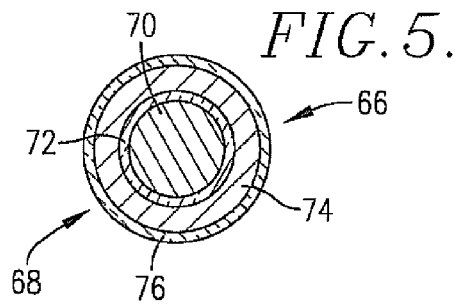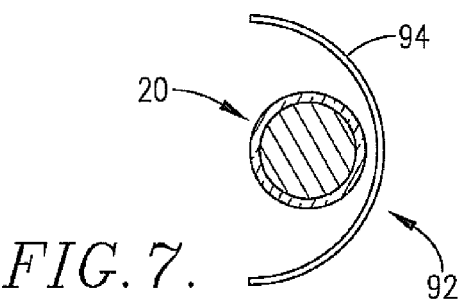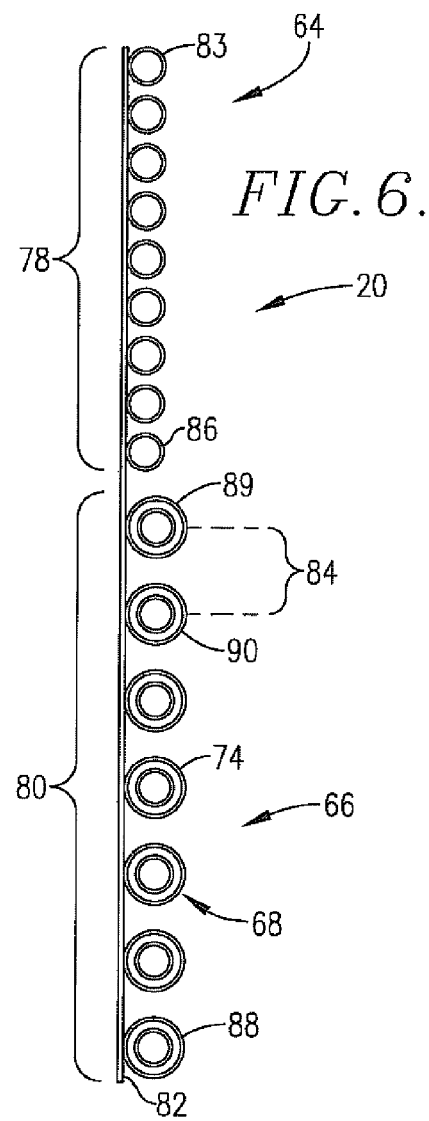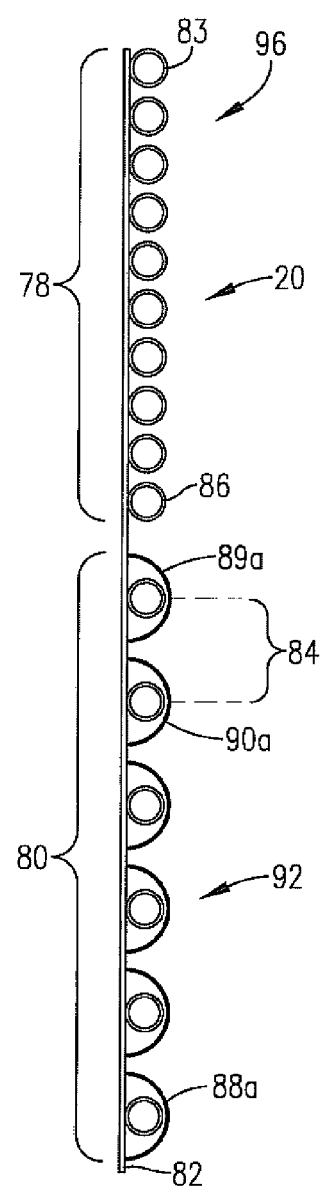

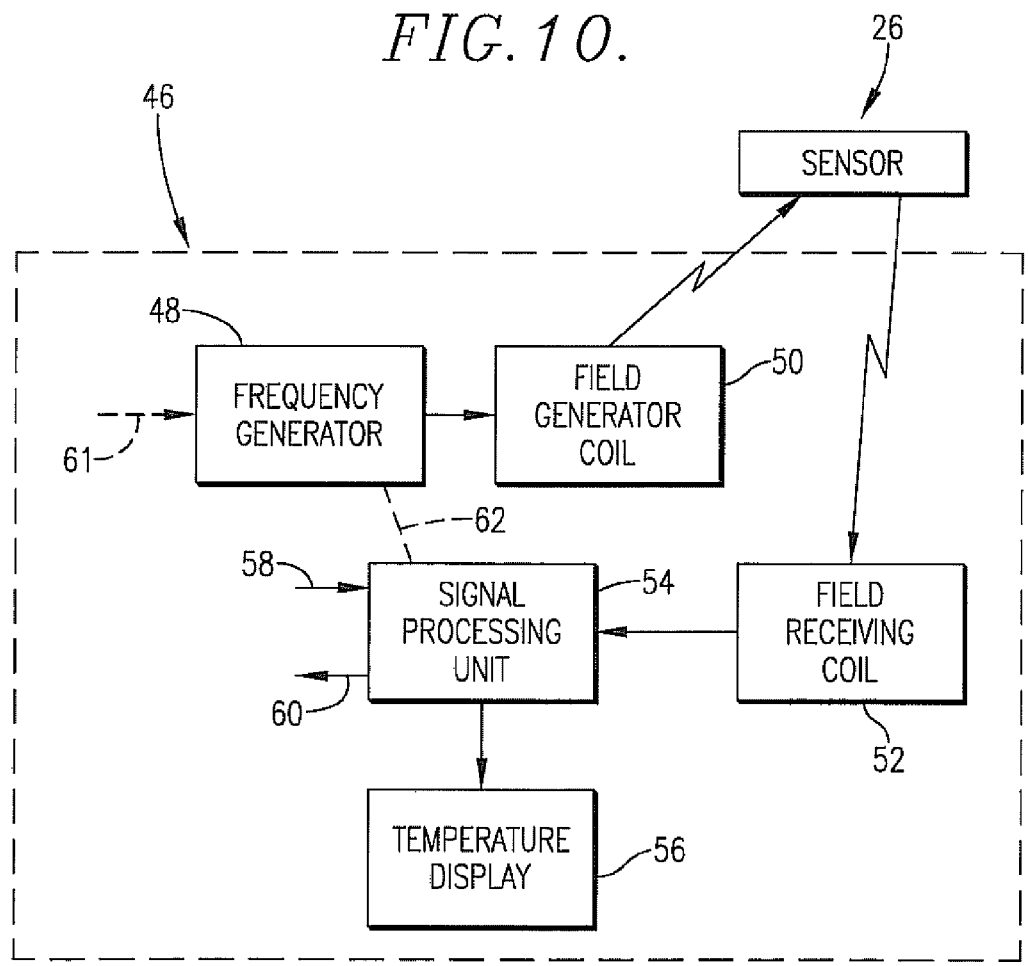

MICROWIRE-CONTROLLED AUTOCLAVE AND METHOD

CROSS REFERENCE TO RELATED APPLICATIONS

This application is a division of application Ser. No. 12/018,100, filed Jan. 22, 2008, entitled "Microwire-Controlled Autoclave and Method," and also claims the benefit of each of the following U.S. patent applications: Ser. No. 11/619,066, filed Jan. 2, 2007, entitled "Magnetic Element Temperature Sensors"; Ser. No. 60/881,866, filed Jan. 23, 2007, entitled, "Microwire-Controlled Autoclave and Method"; Ser. No. 60/919,345, filed Mar. 22, 2007, entitled "Microwire-Controlled Servingware Warming System and Method"; and Ser. No. 11/745,348, filed May 7, 2007, entitled "Magnetic Element Temperature Sensors." Each of the foregoing applications is incorporated by reference herein in its entirety.

BACKGROUND OF THE INVENTION

1. Field of the Invention

The present invention is broadly concerned with magnetic element temperature sensors, detectors for use with such sensors, closed-loop object treatment systems making use of the sensors and detectors to wirelessly determine a temperature parameter related to an object being treated, and corresponding methods. More particularly, the invention is concerned with closed-loop molding/heating/curing systems of the type used for the fabrication of composite parts such as aircraft and automotive components, and including wireless temperature parameter sensor/detector devices. Such systems include pressurized autoclaves, non-pressurized oven-type systems, and resin molding systems.

2. Description of the Prior Art

Autoclave molding is a modification of known pressure-bag and vacuum-bag molding techniques. The advanced autoclave composite process produces denser, void-free moldings owing to the more uniform and controlled heating and more uniform and controlled pressure conditions employed for part curing. It is widely used in the aerospace industry to fabricate high strength/weight ratio parts from pre-impregnated high strength fibers, such parts used in aircraft, spacecraft and missiles. Autoclaves are essentially heated pressure vessels, usually equipped with vacuum systems, and are designed to receive composite lay-ups on or in internal molds. Such lay-ups are then heated and cured within the autoclave to yield the finished parts. Curing pressures are generally in the range of 50 to 150 psi and cure cycle times normally involve many hours. The autoclave method accommodates higher temperature matrix resins such as epoxies, having higher strength properties as compared with conventional resins.

Resin transfer molding (RTM) is a low-pressure, low-emission closed molding process for moderate volume production quantities, filling the gap between the slow, contact molding processes and the faster, compression molding processes requiring higher tooling costs. In RTM, continuous strand mats and woven reinforcement are laid up dry in the bottom mold half. Preformed glass reinforcements are often used for complex mold shapes. The mold is then closed and clamped, and a low viscosity, resin and catalyst mixture is pumped into the mold, displacing the air through strategically located vents. Metered mixing equipment is used to control the resin/catalyst ratios, and the resin and catalyst are mixed using a motionless/static mixer, and is then injected into the mold port. Common matrix resins include polyester, vinyl ester, epoxy, and phenolics. RTM moldings are of a uniform thickness and exhibit two finished sides. In order to optimize the surface finish of the parts, a gel coat may be applied to the mold surface prior to molding. High quality parts produced by RTM include automotive body parts, bathtubs, and containers.

Other types of ovens also are used to execute "pressure-bag" or "vacuum-bag" molding processes. These ovens employ hot air to cure composite parts that are typically placed within plastic bags or under thin plastic sheeting sealed to an adjacent tooling surface. This allows a vacuum to be drawn within the cavity defined by the plastic bag or the plastic sheeting and the tooling surface.

Furthermore, repair processes are often executed upon portions of uncured composite material (adjacent previously cured composite materials) that are enclosed within a chamber formed by thin plastic sheeting. Again, a vacuum is typically drawn within the chamber formed by the part and its encapsulating plastic "shield" or "bag" to remove air that can cause voids in the final cured repair. Heat is applied to the uncured composite material via many means such as resistive heating blankets, hot air, high intensity lighting, microwaves, and induction heating of the carbon fibers or particulates in the resin.

A persistent problem with all of the foregoing techniques is the need to accurately monitor the temperature of the parts during the heating, molding and/or curing cycles. In most production curing processes, only the temperature of the air and/or tool is monitored during curing, wherein the curing process follows a "recipe" of time and air/tool temperature that has been pre-determined by curing test parts that have embedded sensors within the parts so as to correlate part temperature with air/tool temperature and dwell time. If in the unusual case that temperature sensors are used to monitor part temperatures during present-day curing processes of production parts (often for the curing of very thick parts), they are typically either surface thermocouples applied to strategic surface locations or are traditional thermocouples that are embedded into non-essential flashings. In either case, these thermocouples must be physically connected to a monitoring system if simple temperature monitoring is the goal or to the autoclave, oven, or RTM control system for curing control purposes. Applying thermocouples to parts and connecting them to the monitoring and/or control systems is a complex and time-intensive process and can also compromise the pressure integrity of the vacuum bag and/or autoclave. Regardless of whether used in an autoclave, oven, or in a repair process, "pressure-bag" or "vacuum-bag" molding processes often make use of thermocouple leads which extend through the vacuum-bag apparatus to external monitoring electronics. The leads penetrating the vacuum-bag or sheeting often cause vacuum leaks which not only interfere with maintenance of desired vacuum levels, but can also allow moisture to pass through the vacuum bag or sheeting, leading to improper cures.

Accordingly, there is a need in the art for improved object treatment apparatus and methods including wireless temperature parameter sensing allowing real-time, non-contact monitoring of objects such as parts and part precursors within the chambers, in order to determine temperature parameters during the course of object treatment (e.g., heating, molding, and/or curing) and thereby permit control of the treatment apparatus using closed-loop feedback without the need for sensor leads of any kind. Furthermore, it would be advantageous if these sensors could be placed deep within thick parts and the wireless detector (reader) could be remote from the part so as not to disturb the curing process. Finally, it would be advantageous if the sensors could remain within the production part after cure for the life of the part without causing any structural degradation of the part.

SUMMARY OF THE INVENTION

The present invention overcomes the problems outlined above, and provides improved apparatus for the treatment of objects, including wireless detection of a temperature parameter related to an object during treatment thereof. Broadly, the apparatus of the invention includes a chamber configured to hold an object to be treated, where the object has an associated magnetically susceptible microwire sensing element operable to sense a parameter related to the temperature of the object during the treatment thereof. The apparatus further has a detector including an antenna assembly proximal to the chamber and operable to generate an alternating magnetic field in the region of the object sensor, and to detect a magnetic response of the sensor as a measure of the temperature-related parameter. This sensor (or multiple sensors) is embedded within the interior of the composite part, preferably within the resin layer of an interior layer of a CFRP composite structure because these sensors can be wirelessly read by the reader through the carbon layers. The sensors may be placed within the composite part by hand during the cure or repair process or may be placed within the composite layer earlier in the manufacturing process (such as during manufacture of pre-preg material).

In preferred forms, the apparatus of the invention is selected from one or more of the group consisting of an autoclave chamber, a resin-transfer mold, a non-pressurized oven, and a pressure-bag or vacuum-bag assembly. In the case of an autoclave, the chamber is in the form of a thick-walled, pressurizable chamber, whereas with bag assemblies which may or may not be placed within an oven or autoclave (for repair purposes the bag assemblies are often heated via hot air blowers, electric resistive elements in heat-blankets placed against the bag assembly, high-intensity lights, and many other sources of heat) the chamber is formed using a flexible bag, sheet, or cover and often an adjacent base. The antenna assembly may be located partially or wholly within the chamber, or may be located exteriorly thereof. In all instances, however, the antenna assembly (either one or multiple antennas) is oriented in a position relative to the object sensor so as to permit interrogation thereof by a generated alternating magnetic field, and to detect the characteristic magnetic response of the sensor.

The sensed temperature-related parameters that are detected and/or calculated by the decoding electronics associated with the antenna assembly (decoding electronics, power supplies, transmit and receive electronics, and antenna assembly collectively forming the "reader") are used by the apparatus controller to establish and maintain appropriate treatment conditions for the object during the treatment cycle. The reader typically employs a microprocessor to decode the re-magnetization signal information gathered by the receive antenna. The decoding algorithms can be either best-fit formulas that correlate the re-magnetization information from the sensor with the actual temperature experienced by the sensor or can be look-up table information that has been pre-calculated from said best-fit formulas or has been empirically determined. The decoding algorithm may simply use the fact that the Curie Temperature of each magnetic element sensor causes the re-magnetization response to disappear when the sensor exceeds the Curie Temperature, or it may also use the fact that parameters of this re-magnetization response (such as the magnitude of the detected voltage, the voltage pulse shape, the pulse's duration, etc.) change in very predictable and easily discernible ways with sensor temperature in a small region of temperatures below the sensor's Curie Temperature. In either case, the reader exports a temperature parameter to the apparatus controller's microprocessor for control purposes (it may also be possible for the reader and apparatus controller to share the same microprocessor, upon with both the decoding algorithms and apparatus control algorithms both reside). The temperature parameter is preferably selected from the group consisting of a temperature of the object, a desired temperature of the object, a temperature range of the object, a desired temperature range of the object, a minimum temperature of the object, a maximum temperature of the object, a heating property of the object, and the temperature of a material supported by the object.

In particularly preferred forms, the sensor comprises a magnetically susceptible sensor microwire element having a re-magnetization response under the influence of an applied alternating magnetic field, and wherein the re-magnetization response is defined by at least one short, detectible pulse of magnetic field perturbation of defined duration and being different below and above at least one set point temperature below about 400° C. Furthermore, this detectible pulse of magnetic field perturbation changes in easily detectible properties such as magnitude of detected voltage, shape, and duration throughout a small range of temperatures prior to the Curie Temperature such that, after normalization against a reference pulse from another microwire whose properties do not change within the desired sensor temperature range, a quantifiable value can be deduced from these detectible properties that correlates to the exact temperature experienced by the sensor. For instance, by integrating the detected voltage vs. time of the detected pulse, normalizing the resultant value, and comparing this normalized value against a look-up table value that correlates resultant values with sensor temperature (or by performing the actual correlation calculations in real time), accurate temperatures can be detected by magnetically susceptible sensor microwire elements in a small range (typically 40 to 50 degrees C.) of temperatures below the Curie Temperature (above which the re-magnetization pulse is not detectible).

Additionally, preferred sensors include a plurality of microwire sensing elements, with at least certain of the sensing elements having a different Curie Temperature than other of the sensing elements. By arranging the different Curie Temperatures such that each different Curie Temperature is adjacent the small range of temperatures over which the nearest (in Curie Temperature) companion sensing element can effectively detect temperature, a sensor with continuous temperature measurement capability over a range of temperatures from approximately 40 C below the Curie Temperature of the lowest Curie Temperature microwire sensing element up to the Curie Temperature of the highest Curie Temperature sensing element can be created. Of course, the reader's decoding electronics can employ an algorithm that only detects when each of the sensor's remagnetization pulses disappears at its respective Curie Temperature (hereafter called the "Simple Decoding Algorithm") or it can employ a more complicated algorithm that determines sensor temperatures between the successive element's Curie Temperatures (hereafter called the "Complex Decoding Algorithm"). The microwire elements are typically formed of amorphous or nanocrystalline metallic material as elongated wires or thin strips having a maximum cross-sectional dimension of about 100 Fm. Preferred metals are alloys selected from the group consisting of Fe-based alloys, Co-based alloys, and mixtures thereof with chromium or other elements that can adjust the Curie Temperature of such alloys therein. The metallic bodies typically have a glass coating surrounding the metal wires or strips. The sensors of the invention are normally placed in thermal contact with an object to be treated, by applying the sensor to a surface of the object, or by embedding the sensors therein.

A variety of objects may be treated in accordance with the invention, and particularly high-value automotive or aircraft parts or part precursors formed of composite and/or synthetic resin materials. Such parts or part precursors are commonly treated by molding, heating and/or curing processes in closed chamber devices.

BRIEF DESCRIPTION OF THE DRAWINGS

FIG. 5 is a schematic cross-sectional view of a temperature-sensing element in accordance with a second embodiment of the invention, depicting a glass-coated amorphous microwire magnetic element surround by a cylindrical sheath of a ferromagnetic metal or ferrite material and having a desired Curie temperature;

FIG. 6 is an essentially schematic cross-sectional view of a magnetic temperature sensor in accordance with the invention, making use of microwire data elements of the type illustrated in FIG. 1, and temperature-sensing elements as illustrated in FIG. 5;

FIG. 7 is a schematic cross-sectional view of another temperature sensing element in accordance with a third embodiment of the invention, wherein glass-coated microwire magnetic elements as illustrate in FIG. 1 and located adjacent a shield of ferromagnetic metal or ferrite material having a desired Curie temperature;

FIG. 8 is an essentially schematic cross-sectional view of a magnetic element temperature sensor in accordance with the third embodiment of the invention including data elements as illustrated in FIG. 1 and temperature-sensing elements as illustrated in FIG. 7;

FIG. 10 is a schematic block diagram of a temperature reader in accordance with the invention operable to interact with the magnetic element temperature sensors hereof;

DETAILED DESCRIPTION OF THE PREFERRED EMBODIMENTS

Prior Art Magnetic Elements and Detection Systems

In order to best understand the present invention, it is helpful to understand the nature and operation of present-day EAS and authentication systems employing magnetic elements (often referred to as "magnetic markers") and their corresponding detection systems.

One type of magnetic element often used is a glass-coated amorphous microwire. Such microwires, their production, magnetic properties, and behaviors below their Curie temperatures, have been disclosed in the technical and patent literature. See, for example, U.S. Pat. Nos. 6,441,737 and 6,747,559; Horia Chirac, Preparation and Characterization of Glass Covered Magnetic Wires, Materials Science and Engineering A304-306, 166-71 (2001); Donald et al., The Preparation, Properties and Applications of Some Glass Coated Metal Filaments Prepared by the Taylor-Wire Process, Journal of Materials Science, 31, 1139-48 (1996); Wiesner and Schneider, Magnetic Properties of Amorphous Fe—P Alloys Containing Ga, Ge, and As, Phys. Stat. Sol. (a) 26, 71 (1974); and Antonenko et al, High Frequency Properties of Glass-Coated Microwires, Journal of Applied Physics, vol. 83, 6587-89. Continuous lengths of microwires have been produced inexpensively by what is generally called in the art the Taylor process whereby either a pre-alloyed ingot or the required elemental constituents are melted in a generally vertically disposed glass tube that is sealed at the bottom. Once the alloy is converted to a molten state, using radio frequency ("rf") heating for example, the softened bottom of the glass tube is grasped and drawn into continuous microwire. Rapid reduction of alloy cross-section, together with use of secondary cooling means, cause the alloy to become amorphous or nanocrystalline during drawing.

Figure 1:
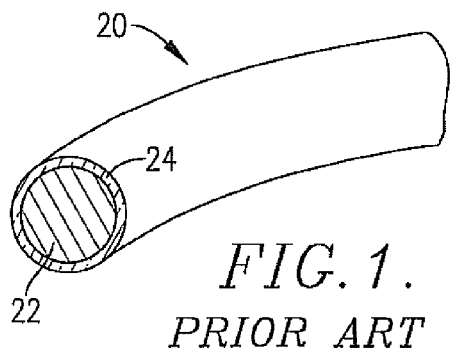
FIG. 1 is a fragmentary view in partial section illustrating a prior art magnetic microwire element suitable for use in the present invention.

A typical microwire 20, anywhere from ten or less microns in total diameter to tens of microns in total diameter, is depicted in FIG. 1. The wire 20 has an alloy core 22, and glass coating 24, wherein the alloy core 22 and the glass coating 24 can be physically coupled to each other continuously or only at several spatially separated points. The glass-to-metal ratio, though variable, can be tightly controlled. For example, the typical thickness of glass-coating 24 may be from about 1-5 microns for a 45-60 micron core diameter microwire, and typically 1-3 microns for 30 micron core diameter microwire. Microwire elements for prior art EAS and authentication tags are usually cut to lengths ranging from 15 mm to 75 mm.

Figure 2:
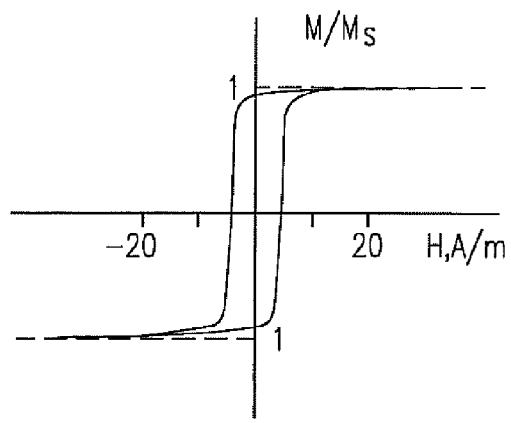
FIG. 2 is a graphical illustration of the magnetic characteristics of a microwire suitable for use in the present invention, at temperatures below the Curie temperature of the microwire alloy.

The microwire magnetic properties and resultant hysteresis loops can be controlled by varying the alloy composition and the glass-to-metal diameter ratio. FIG. 2 illustrates an idealized magnetic hysteresis loop response of a typical microwire 20 with a large Barkhausen discontinuity, suitable for use in the present invention as described below. When such a microwire 20 is exposed to an external alternating magnetic field whose field strength, in the direction opposing the instantaneous magnetic polarization of the element is greater than the coercive force Hc, here shown ideally to be less than 10 A/m, the re-magnetization process results in the generation of a harmonically rich pulse that is easily detected. The magnetic flux changes during the pulse give rise to a peak in the flux derivative over time. Accordingly, a voltage peak will be observed in a receiving coil placed in the vicinity of the element and the reader may correlate that voltage peak to the presence of a microwire element in the field.

Prior art glass-coated amorphous microwires 20 produced by the Taylor method can be fabricated so as to exhibit very low coercivities (substantially less than 10 A/m), high relative permeabilities (substantially higher than 20000), substantially zero or slightly positive magnetostrictions, and large Barkhausen discontinuities (which means that the microwires exist essentially only in bimodal magnetic states).

Figure 3A:
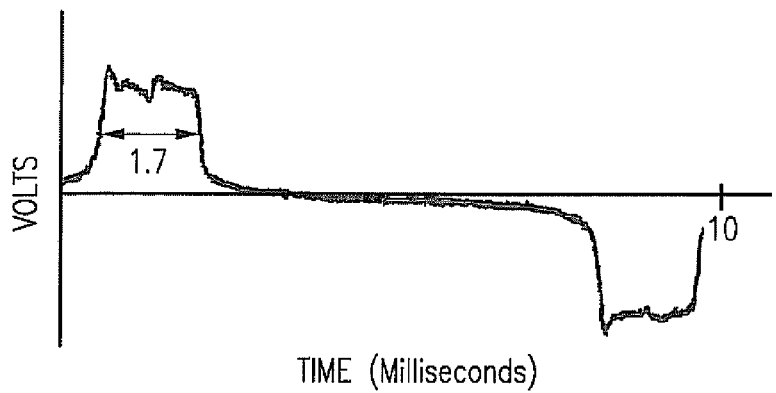
FIG. 3A is a graph of time versus re-magnetization of an amorphous strip typically used in conventional in anti-shoplifting EAS markers or tags.
Figure 3B:
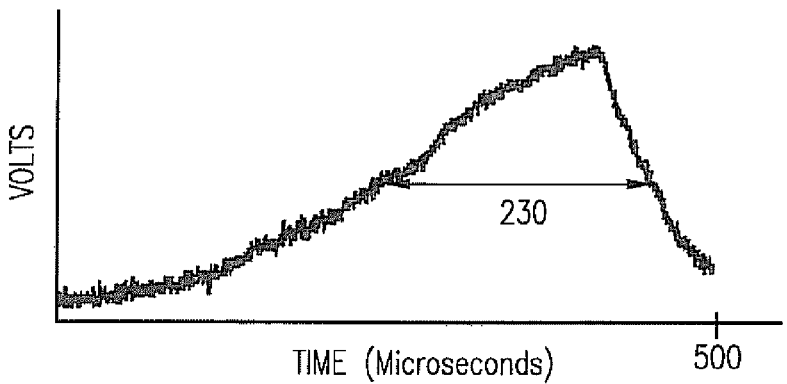
FIG. 3B is a graph of time versus re-magnetization of an amorphous microwire having a large Barkhausen discontinuity, used in the markers or tag commercially available from Sensormatic Co.
Figure 3C:
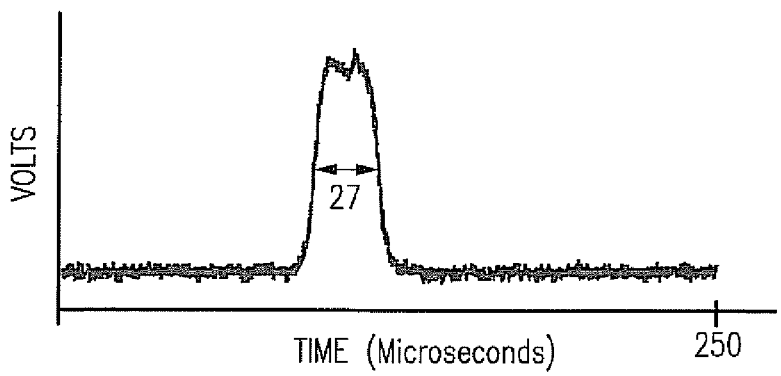
FIG. 3C is a graph of time versus re-magnetization of a glass-coated amorphous magnetic microwire produced by the Taylor method.

The re-magnetization properties of the microwires 20 are also important, and distinguish such microwires from other types of prior art magnetic elements. Referring to FIG. 3C (see U.S. Pat. No. 6,556,139) it will be seen that the re-magnetization peak width (measured at half amplitude level) was in the range of 25-80 micro seconds for a glass-coated amorphous microwire. In contrast (see FIG. 3B), markers or tags commercially available from Sensormatic Co. comprises an in-water-cast amorphous wire with large Barkhausen discontinuity, the peak width was in the range of about 200-500 micro seconds or more. Finally (see FIG. 3A), the peak width was about 1-2 milliseconds for amorphous strips typically used in anti-shoplifting markers or tags, e.g., a Meto GmbH 32-mm marker or tag. Thus, microwires of the type illustrated in FIG. 1 exhibit extremely short re-magnetization peaks which allow discrimination of a microwire response from background noise such as that caused by field interaction with other external objects.

Zhukov et al., J. Mater. Res. 15 No. 10 Oct. (2000), describe the production of multi-bit markers when utilising multiple amorphous glass-coated wire segments, each having a different dimension (length, gross diameter, etc.) or magnetic property (e.g., coercive field). For instance, if a plurality of magnetic microwire elements exhibit different coercivities, respectively, each of their unique re-magnetization peaks can be detected in each magnetic field period, and their pattern may be recognized, for example, by methods described in U.S. Pat. No. 4,203,544. U.S. Pat. No. 5,729,201 describes a method to differentiate such a plurality of wires, even if they have the same magnetic properties and dimensions. A permanent magnet bias field element in the vicinity of the wire serves to differentiate the amplitude of the external magnetic field generated by a reader that is required to exceed the coercive force for re-magnetization of each magnetic element by way of its different proximity to each individual wire segment. This leads to a phase difference in re-magnetization peaks detected, thus allowing differentiation of the individual elements.

U.S. Pat. No. 4,134,538 describes multi-element tags (markers) constructed of magnetic elements, each characterized by a different coercive force and thereby permitting the assignment to any attached object of a reference code with as many characters as magnetic elements utilised. One thus assigns, respectively, each character of the reference code to a magnetic element in the order of the values of their respective coercive forces, the signals corresponding to each magnetic element then appearing in the detection apparatus in the same order of dephasing as the order of the coercive forces and each with amplitudes corresponding to the values assigned at the time of coding, thus reproducing the complete code in arrangement and in amplitude.

U.S. Pat. No. 6,622,913 teaches that data information may be encoded in binary form by using microwire elements of different diameters or permeabilities, so that they produce considerably different responses to an alternating magnetic field produced by a transmitter. Accordingly, one type of microwire may present binary "0" and the other binary "1". For instance, an array of four microwires each with successively larger coercivities such that they are each easily distinguished by their detected phase differences over a period of an incident alternating magnetic field, can be made to produce alternating high and low amplitudes of field perturbations (and thus alternating high and low voltage amplitudes at the detector) so that they represent a binary pattern of 1010.

U.S. Patent Application No. 2005/0109435 describes several magnetic and optical methods of encoding multi-bit information on a single microwire. The stress sensitivity of ferromagnetic amorphous glass-coated microwire can be used advantageously as the physical basis for affecting magnetic domain structure. Ferromagnetic amorphous glass-coated microwire encoding can result from a localized alteration of this domain structure. The alteration is readily accomplished by imposition of localized stresses or by selective crystallization of the amorphous alloy. Such changes are affected by a number of means, including localized heating via pulsed laser, chemical thinning of the glass coating, coatings on the glass, and the like. Localized modifications of the glass-coating of ferromagnetic amorphous glass-coated microwires can be used to effectively produce controlled changes in the magnetic domain structure of the amorphous alloy cores, thereby enabling encoding. The preferred method is to use laser pulses to locally heat the glass or alloy (independent heating can be accomplished by choice of wavelength) causing changes in the structure of one or both, and thereby altering the extant stress fields or the basic magnetic characteristics.

Prior art EAS or authentication system detector devices used in conjunction with all types of magnetic elements used as magnetic markers typically use field transmitter unit and a magnetic field detector unit. The field transmitter generally has a frequency generator and a field generator coil (constituting together an alternating magnetic field source) for creating the alternating magnetic field in the interrogation zone of the marker. The detector unit normally has a field receiving coil and a signal processing unit that typically triggers an alarm device.

In prior art EAS systems, when a magnetic marker is located in the vicinity of the coils, the interrogating AC field causes the switching of the magnetic element's magnetization. Accordingly, very short pulses of magnetic field perturbations are received by the field receiving coil. These pulses are detected by the signal processing circuit, which produces an output to activate an alarm.

First Embodiment

Modified Chemistry Microwires for Curie Temperature Sensing

The first microwire embodiment of the invention comprises a magnetic microwire temperature sensor having at least one and usually a plurality of magnetically susceptible microwires, with the individual alloys of at least certain of the microwires having modified chemistries and consequent different Curie temperatures, usually below about 400° C. Additionally, this embodiment includes a microwire reader/detector capable of decoding temperature information derived from the sensor microwires. As noted, the reader/detector may employ a "Simple Decoding Algorithm" that returns discrete temperatures from the sensor that correspond to the Curie Temperatures of each of the magnetically susceptible microwires. Alternately, the reader/detector may employ a "Complex Decoding Algorithm" that returns continuous temperatures from the sensor that corresponds to not only the Curie Temperatures of each of the comprising magnetically susceptible microwires, but also the temperature information derived from discernible changes in pulse parameters between the Curie Temperatures of successive temperature-sensing microwires.

Chemically modified individual microwires are preferably fabricated so that the modified microwires retain large Barkhausen discontinuities, extremely low coercivities, and extremely high permeabilities below their respective Curie temperatures (with resultant hysteresis behavior of the type depicted in FIG. 2). These modified microwires essentially completely lose their ferromagnetism above their Curie temperatures. Other microwires within the array of the sensor need not have modified chemistries, but can operate as data elements according to any of the prior art methods of single or multi-bit encoding previously discussed.

The most preferred chemical modification of Fe-based and/or Co-based alloys used in prior art amorphous microwires is the adjustment of the atomic percentage of chromium therein. Chromium in amorphous iron-based (Fe80-xCrx)(PC)20 alloys has a sizeable effect on their magnetic properties. An increase in Chromium percentage lowers the Curie temperatures, the average hyperfine fields, and the saturation magnetizations thereof, and on the other hand markedly increases their initial permeabilities. For instance, an increase in the Chromium percentage from 0% to 6.5% reduced the Curie temperature from 330° C. to 155° C. in certain tested samples. See, Henry et al., Magnetic Measurements of Iron-Rich Amorphous Alloys Containing Chromium: Mossbauer Study and B-H Loops, Journal of Materials Science 19: 1000-06 (1984); and Wijn, Magnetic Properties of Metals—d-Elements, Alloys, and Compounds, Springer-Verlag, Berlin (1991).

Other chemical changes to Fe-based and Co-based alloys can also be utilized to alter the magnetic characteristics of amorphous microwire elements. For example, Co can be substituted for Fe in certain FCZBN alloys, and the resultant Curie temperature exhibits an sinusoid-like behavior with increasing Co content, and reveals two maxima at 3 and 12.5 atomic % Co and a minimum at 7.5 atomic % Co (Yao et al., Co Dependence of Curie Temperature in Amorphous Fe Co Zr B Nb Alloys With High Glass Forming Ability, Journal of Physical Science: Condensed Matter, Vol. 16 6325-34 (2004). IEEE Transactions on Magnetics, Vol. 22, 1349-51 (1986) presents a process whereby Co—P amorphous alloys with a high P content can be electrolytically obtained. The Curie temperature of these alloys shows a linear behavior in Curie temperature versus composition up to 28-29% P. For higher concentrations, a constant Curie temperature is observed.

As explained above, the first embodiment preferably makes use of a plurality of magnetic microwire temperature sensing elements whose chemistries have been changed so that the microwires become paramagnetic at individual temperatures (usually about 400° C. or below) within specific design temperature range of the overall temperature sensor.

Figure 4:
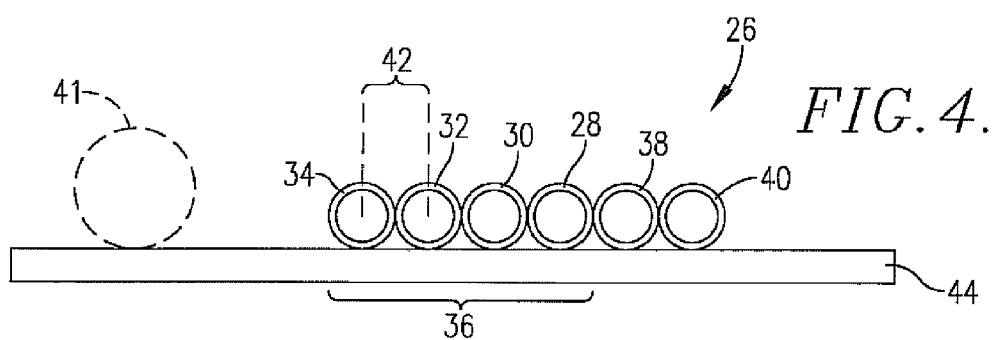
FIG. 4 is an essentially schematic cross-sectional view of a magnetic temperature sensor attached to an object to be sensed and in accordance with a first embodiment of the invention.

For example, FIG. 4 depicts a temperature sensor 26 having a total of four temperature-sensing microwires 28-34 forming an array 36. Each of the microwires 28-34 has its chemistry modified using any of the forgoing techniques such as an increasing atomic percentage of chromium, with the result that the Curie temperatures of the microwires are different and are all exceeded during the normal operating temperature range of the sensor 26. The remaining two microwires 38 and 40 are data elements. An optional permanent magnetic bias field element 41 can also be employed.

In the FIG. 4 embodiment, the microwires 28-34 are arranged in parallel relationship where the spacing 42 is equal to the sum of the radii of each adjacent microwire (spacing 42 may be larger than the sum of the radii), and are held together by a thermally conducting adhesive (not shown) that also adheres the microwires to an object 44 to be temperature-monitored.

In this exemplary embodiment, the magnetic coercivity of each microwire 28-34 and 38-40 is altered by appropriate chemical changes in the alloys thereof, and specifically the chromium content of each alloy, in order to ensure that each of the six microwires is uniquely detectable within each period in the order of their location within the overall array. Of course, other prior art techniques for changing alloy chemistry as well as for adjusting coercivity can also be used for this purpose. Additionally, each of the six microwires 28-34 and 38-40 are of the same length (e.g., 20 mm) except for microwire 38, which is significantly longer (e.g., 40 mm). This extra length for the microwire 38 ensures that the detected re-magnetization peak from this data element microwire is larger in amplitude than all other re-magnetization peaks.

FIG. 10 illustrates an exemplary detector device 46 used to detect temperatures sensed by sensor 26, corresponding to the temperature of the object 44. The detector 46 broadly includes an alternating magnetic field transmitter unit in the form of a frequency generator 48 coupled with a field generator coil 50, such that the transmitter unit is operable to create an alternating magnetic field for interrogating sensor 26. The overall device 46 further includes a field receiving coil 52 operably coupled with a digital signal processing unit 54 and a temperature display 56. As illustrated, the processing unit 54 is equipped with communication ports 58 and 60, and may be operably coupled with frequency generator 48 via connection 62. Additionally, frequency generator 48 may be equipped with an optional input 61 permitting remote control of the generator.

The signal processing unit 54 operates using a decoding algorithm having the capability to decode the magnetic field perturbation information received upon interrogation of the sensor 26. Preferably the decoding algorithm is in the form of one or more look-up tables for different sensors in accordance with the invention, stored within memory associated with the unit 54. In the case of a detector 46 specific to sensor 26, whose signal processor unit 54 employs a "Simple Decoding Algorithm," the temperature look-up table would have both the expected phase position (phase relationship from the stop bit and/or from each other) for each of the four temperature sensing microwire elements 28-34, as well as the temperatures to report for each of the acceptable detected bit codes from the array 36 of microwires 20 (some bit codes may be unacceptable because they make no logical sense according to the phased microwire order of Curie temperatures and thus are the product of a mis-read by detector 46). In the case of a detector 46 whose signal processing unit 54 employs a "Complex Decoding Algorithm", the look-up table includes all of the information used within the "Simple Decoding Algorithm" as well as the unique, normalized pulse parameter values and correlated temperatures for each of the temperatures (with a chosen interval between said temperatures) within a small range of temperatures below its Curie Temperature. Thus, for example, if an acceptable bit code from the array 36 of microwires 20 is determined by the signal processing unit 54 employing a "Complex Decoding Algorithm", the signal processing unit 54 would access the portion of the look-up table that correlates pulse parameter values with sensor temperature in the range of temperatures between the Curie Temperature of the highest-Curie-Temperature-microwire whose re-magnetization pulse has disappeared and the Curie Temperature of the lowest-Curie-Temperature-microwire whose re-magnetization response is still detectable. The "Complex Decoding Algorithm" allows the signal processing unit to compare the currently detected and calculated value of the pulse parameter to said appropriate range of values within the look-up table to arrive at the sensor's temperature: a sensor temperature that is now discernible to a high resolution within the small range of temperatures below the Curie Temperature of the lowest-Curie-Temperature-microwire whose re-magnetization response is still detectable.

As described, the sensor 26 and detector device 46 are correlated so that the device 46 can, by proper interrogation of sensor 26, ascertain the temperature of object 44. Such correlation normally involves at least matching the bit logic of sensor 26 with the decoding algorithm(s), in this case, the temperature look-up table(s) stored in the memory of signal processing unit 54. Those skilled in the art will appreciate that a wide variety of bit logics and corresponding algorithms tables can be provided for both the "Simple Decoding Algorithm" and the "Complex Decoding Algorithm" described herein. However, the following discussion provides one exemplary system employing a "Simple Decoding Algorithm" in the context of the sensor 26 and detector device 46 of FIG. 10.

Again referring to FIG. 4, assume that the least significant bit of the four temperature-sensing element microwires 34-38 is microwire 28, which can be denominated the "first" microwire. Thus, when object 44 is below the Curie temperature of the first microwire 28, the microwire 28 will still produce its characteristic short re-magnetization pulse under the influence of the alternating magnetic field generated by device 46. When object 44 has a temperature above the Curie temperature of the first microwire 28, the microwire 28 will no longer produce its short re-magnetization pulse under the influence of the applied alternating magnetic field, and therefore its bit will be missing (a "0" value) from the detected temperature-sensing element array of bits.

The remaining temperature-sensing microwires 30-34 each have respective, chemically modified alloys therein, so that the Curie temperatures of the microwires are successively and in stepwise fashion slightly higher than that of the first microwire 28. Thus, the "second" microwire 30 has a slightly higher Curie temperature than the first microwire 28, and the "third" and "fourth" microwires 32 and 34 each have successive, slightly higher Curie temperatures than the lower-order microwires. In this manner the re-magnetization pulses (bits) of the microwires 30-34 will disappear (i.e., become a "0" value) under the influence of the applied magnetic field from detector 46 at respective temperatures each higher than that of the first microwire 28 and of all preceding lower-order microwires.

For example, if the object 44 has a temperature below the Curie temperatures of both the first and second microwires 28 and 30, all bits of the array 36 will be read (i.e., become a "1" value) by the device 46. If the object 44 has a temperature above the Curie temperature of first microwire 28, but below the Curie temperature of second microwire 30, the first bit will have disappeared to the device 46 as a "0" value, and the remaining bits corresponding to microwires 30-34 will be read as a "1" value by the device 46.

As noted above, the device 46 contains algorithm(s) in the form of look-up table(s) that recognize that the disappearance of the first temperature bit and the appearance of the second and all higher temperature bits means that the temperature of object 44 exists somewhere between the first and second Curie temperatures of the first and second microwires (temperature bits) 28 and 30 (as used herein, detection or determination of sensor or object temperature can refer to a single temperature or an approximated temperature within a range of temperatures). Thus, by reading the temperature-sensing bit data generated by the array 36, and correlating the binary value of this data to the look-up table of interest, the temperature of object 44 can be determined within the temperature range defined by the interval between the first and second microwire Curie temperatures. Of course, this logic applies to all four of the microwires 28-34, of the simple FIG. 4 example.

If the number N of temperature-sensing microwires on a given magnetic element temperature sensor have identified Curie temperatures of known increasing sequential order, and these Curie temperatures are selected to be at least somewhat consistent in their increments from one to another, the sensor can detect temperatures from the first to the $N^{th}$ Curie temperatures. The resolution of such a sensor whose companion reader employs a "Simple Decoding Algorithm" is the increment between sequential Curie temperatures. It will be appreciated that even if the sequential Curie temperatures are not exactly consistent, the relevant look-up table can be constructed and the sensor can properly function. It should be understood that, in cases where the reader employs a "Complex Decoding Algorithm", the resolution achieved is much greater and is determined by many factors such as the accuracy of the best-fit formula.

The microwire alloys of this embodiment can have their Curie temperatures quantified before or after the alloys have been processed into microwires. Furthermore, the detectible changes in the re-magnetization pulse that occur below the Curie Temperature can be quantified and normalized for factors such as read distance and transmitter field strength in a carefully controlled environment. In this fashion the complete microwire sensor can be calibrated for temperature sensing.

In cases where a certain temperature-sensing microwire does not disappear in proper sequence with the other microwires (due to a mis-read by the reader/detector, a lack of thermal contact with the others, or other reason), the lack of an acceptable look-up table value preferably causes the reader/detector algorithm of device 46 to attempt a re-read of the sensor 26. If continuous re-reads show the same anomalous temperature data, the reader/detector algorithm can discard the temperature data, use the last measured temperature (or the last measured temperature plus a delta temperature that is based upon a calculation involving the last measured rate of change of temperature and reading time interval), and then try again at the next scheduled read interval. Preferably, steps are taken to ensure that all microwires make good thermal contact with each other and the object 44 whose temperature is to be measured. One such step is to attach all of the microwires to a thin, thermally conductive substrate. Another step is to employ thermally conductive encasing or potting materials as described hereinafter.

It is known that up to 40 microwires may be detected within a period, and accordingly a magnetic element temperature sensor of this embodiment may contain many more than four temperature-sensing microwires 20 and many more than one (not counting the stop bit) data elements. Data elements, especially if each is encoded with multi-bit data, can be used to store correlation information (such as linear or non-linear relationship constants) that can allow the detector algorithm to decode the "specific numerical value" (temperature bits) to its associated temperature value. This is particularly valuable where a look-up table method is not used. Thus, the magnetic element temperature sensor 26 may store in its data elements data such as a permanent ID code or a "class of object" code. This ability to store a "class of object" code allows a single reader/detector algorithm to read several different types of microwire temperature sensors, each with its own unique look-up table, and still decode the correct temperature.

It will be appreciated that a number of different encoding/decoding strategies can be employed in sensor 26 and device 46 without departing from the scope of the present invention, providing that each temperature-sensing microwire is designed to lose its re-magnetization pulse properties under the influence of the alternating magnetic field generated by device 46 above its Curie temperature. One option would be the use of bias field element 41, which serves to differentiate the amplitude of the external magnetic field generated by device 46 that is required to exceed the coercive force for re-magnetization of each microwire, owing to its different proximity to each individual microwire 28-34 and 38-40. This leads to a phase difference in re-magnetization peaks detected by detector 46, thus facilitating differentiation of the six individual microwires. Other variations would include without limitation means to determine a stop or "delineation" bit between temperature-sensing elements and data elements, encoding and decoding of non-temperature data, and differing lengths for some or all of the microwires in order to alter the magnetic responses thereof. Additionally, changes in magnetic properties at temperatures close to the Curie temperatures of the individual temperature-sensing microwires can alter but not entirely eliminate the detectable re-magnetization pulses thereof. Such altered re-magnetization pulses, having predictable behaviors over specific temperature ranges below the Curie temperatures, may also be used to decode temperature information. This can allow each temperature-sensing microwire to accurately sense more than one temperature, e.g., from a small interval below the Curie temperature up until the Curie temperature when employing a "Complex Decoding Algorithm" within the reader's decoding electronics.

Second Embodiment

Microwires with Ferromagnetic Sheaths for Temperature Sensing

This second embodiment comprises a magnetic element temperature sensor 64 having a plurality of composite temperature-sensing microwires 66 each including a magnetically susceptible microwire of the prior art type described above that has no intentional reduction of its Curie temperature, such that it will retain its large Barkhausen discontinuity and other magnetic properties as depicted in FIG. 2 throughout the entire operating range of the sensor 64. This microwire structure further includes a surrounding, tubular, structure 68. The overall second embodiment further includes a microwire temperature detector similar to detector 46 having stored algorithm(s) capable of decoding the temperature information derived from interrogation of the sensor 64.

In particular, each of the composite microwires 66 has an innermost alloy 70 surrounded by an intermediate glass coating 72, such that this inner portions of the composite microwires 66 are conceptually identical with previously described prior art microwires 20. Additionally, the structure 68 of the microwires 66 include a tubular sheath 74 of ferromagnetic metal or Ferrite material (such as NiZn or MnZn) surrounding the coating 72, and an optional outermost glass coating 76 surrounding the tubular sheath 74. The sheath 74 has a Curie temperature carefully chosen so that the individual, inner microwire alloy 70 will produce its signature perturbations (and thus re-magnetization voltage pulses at the detector) only when the microwire is placed in the alternating magnetic field generated by the detector, and then only above the Curie temperature (or above some temperature near the Curie temperature) of the ferromagnetic sheath 74. Hence, when the composite microwire 66 experiences a temperature below the Curie temperature of the ferromagnetic sheath 74 (or below some temperature near this Curie temperature), the sheath 74 is ferromagnetic, thus altering the signature pulse of the microwire 66. This may prevent re-magnetization of the composite microwire 66 owing to magnetic saturation caused by the sheath 74, or may allow the resulting re-magnetization as a biased or "altered" signal from the composite microwire 66. For example, the re-magnetization pulse may be offset in phase from its location above the sheath Curie temperature, or the biasing effect of the sheath may allow altered re-magnetization responses below and above a plurality of different set point temperatures.

When the composite microwire 66 experiences a temperature above the Curie temperature of the sheath 74, the sheath becomes paramagnetic and thus has no effect upon the signature pulse of the alloy 70. Therefore, above the individual Curie temperatures of the sheaths 74 (or above some temperatures near these Curie temperatures), the composite microwires 66 act normally (i.e., they cause the detector 46 to detect a voltage pulse as expected in phase, amplitude or the like, as recorded in a look-up table or via some other decoding algorithm). However, when the composite microwires 66 experience temperatures below the individual Curie temperatures of their sheaths 74, they are either not detectable by the detector, or are detectable but have their magnetic properties altered, especially in relation to signature pulses detected above temperatures of the Curie temperatures of their sheaths 74. Such altered magnetic properties either would not fit the parameters of the look-up if the reader employs a "Simple Decoding Algorithm" or could be used to correlate to a temperature below the Curie Temperature if the reader employs a "Complex Decoding Algorithm."

If the material making up tubular sheath 74 is a ferromagnetic metal, the sheath 74 may be only microns thick or as thick as required for saturation for inner microwire alloy 70, and for manufacturability. One method of forming the ferromagnetic sheath 74 is described in U.S. Pat. No. 7,011,911 entitled "Amorphous Microwire and Method for Manufacture Thereof." Other methods include flame spraying or sputtering. When using these methods for creating the sheath 74, it is not necessary that there be an outermost coating 76. A modified Taylor method may also be employed, wherein an inside glass tube and an outside glass tube are coaxially and telescopically aligned such that the inside glass tube resides within the walls of the outside glass tube. The alloy 70 is inside the center glass tube in ingot (rod-shaped) or constituent metal form, whereas the material making up tubular sheath 74 is located between the interfitted glass tubes. This sheath material may be in ingot (possibly several rods) or constituent metal form. The alloys are heated to molten by magnetic induction or other suitable means and the resultant molten metal and glass is quickly drawn to form a composite microwire 66.

Figure 9:
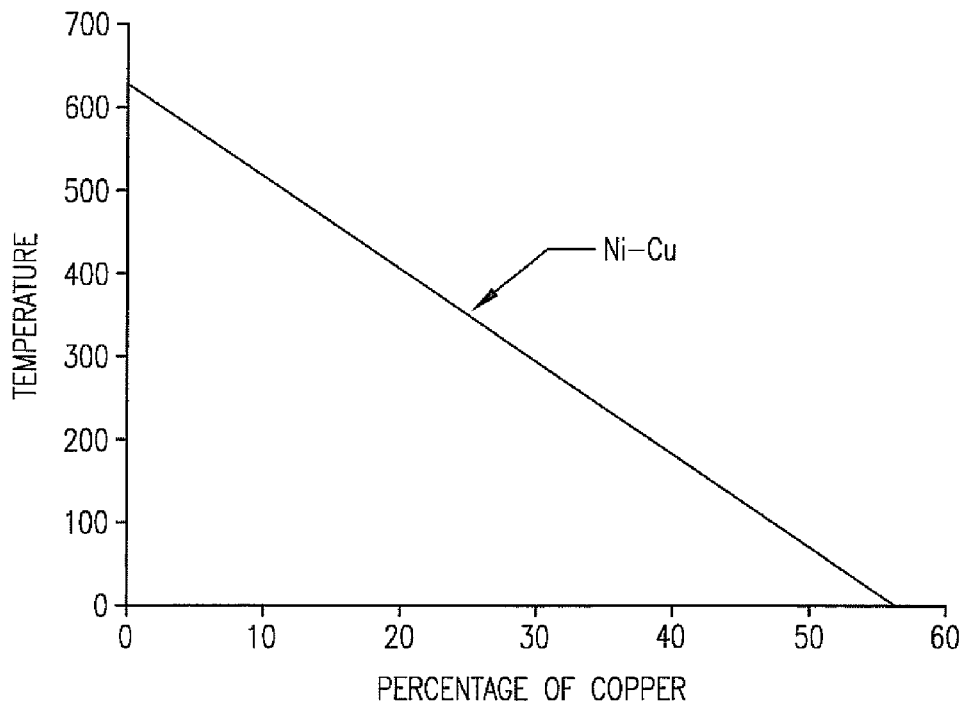
FIG. 9 is a graph illustrating the Curie temperature versus percentage of copper for nickel-copper alloys suitable for use as sheaths for the temperature-sensing elements of the second embodiment of the invention, or as shields for the temperature-sensing elements of the third embodiment of the invention.

Techniques are known in the art for adjusting the Curie temperatures of ferromagnetic alloys by addition of trace elements of specific metals. Thus, any number of alloys may be used to make up the tubular sheaths 74. FIG. 9 illustrates that small additions of certain metals (in this case Copper) to ferromagnetic metal elements (in this case Nickel) so as to form a true alloys can alter the Curie temperature of the resultant ferromagnetic alloys in a predictable way. Also, additions of small amounts of Chromium to Iron yield alloys whose Curie temperatures are predictable. See U.S. Pat. No. 5,954,984, for a discussion on modifying the Curie temperature of Nickel with Copper and Aluminum.

The alloys or Ferrite materials used in the fabrication of the tubular sheaths 74 can have their Curie temperatures (or regulation temperatures near their Curie temperatures) quantified before or after the alloys or Ferrite materials have been processed into tubular sheaths 74. Thus, the magnetic element temperature detector 46 can be readily calibrated for temperature sensing. As before, for a given temperature range to be measured, the more temperature-sensing composite microwires 66 whose sheath Curie temperatures are quantified and are near-equally spaced within the temperature range, the higher the resolution of the temperature sensor. It is preferred to have at least 20 temperature-sensing composite microwires 66, each having a sequentially higher sheath Curie temperature, at most 5° C. above the next lowest order sheath. Of course, if the sheath 74 alters the re-magnetization pulse of the microwire 66 over a range of temperatures near the Curie temperature of the sheath 74 (say, for instance, by detectably shifting the phase of the re-magnetization pulse), it may be possible for the detector that employs a "Complex Decoding Algorithm" to sense and decode multiple temperatures for each microwire 66 within a certain range, thus requiring fewer microwires 66 to allow a sensor to accurately measure temperatures over a wide range.

If the material making up the tubular sheaths 74 is a Ferrite or some blend of materials with Ferrite, then the sheath may either be adhered to the glass layer 72, a separate cylindrical bead, or other sintered Ferrite cylindrical object with a central hole such that the alloy 70 and surrounding glass 72 may be placed therein. Alternately, the tubular sheath 74 could be formed as a part of the glass layer 72 by using a glass-ferrite material for layer 72 in lieu of pure glass. U.S. Pat. No. 6,909,395 entitled "Radar Absorbing Coatings" describes Ferrite/glass composite material that can be used to either adhere directly to a metal wire or other shape of metal object, or can be adhered to a layer of pure glass that is already adhered to the metal.

Referring now to FIG. 6, the sensor 64 includes a plurality of microwires 20 presenting an array 78 of data elements, and a plurality of temperature-sensing composite microwires 66 forming an array 80 thereof. The microwires 20 and composite microwires 66 are attached to a sensor or tag substrate 82, which is as thin and as thermally conductive as possible so that the sensor 64 may be placed in intimate thermal contact with an object (not shown) for temperature measurement purposes.

The microwires 20 making up array 78 have chemistries giving individual Curie temperatures above the planned operating temperature range usually less than about 400° C. for the sensor 64. The composite microwires 66 within array 80 are preferably spaced apart by a distance 84, such that the ferromagnetic or Ferrite tubular sheath 74 of each individual composite microwire 66 does not affect its neighbor composite microwire once the tubular sheath 74 of the individual microwire experiences a temperature above its Curie temperature.

In this simple embodiment where the reader employs a "Simple Decoding Algorithm", assume that each data element of array 78 is laser coded to a logic state of "1" or "0." Furthermore, assume that each of the data elements is the same length (say, 20 mm) except for terminal elements 83 and 86, which are significantly longer (say 40 mm). This extra length ensures that the detected re-magnetization peaks from data elements 83 and 86 are larger in amplitude than the others. Finally, assume that the data element 83 is laser coded to a logical "1" value whereas data element 86 is laser coded to a logical "0" value. As described in the first embodiment, each of the elements of both arrays 78 and 80 are made so that the detected phase order matches the depicted alignment order from top (microwire 83) to bottom (composite microwire 88), the latter having the highest sheath Curie temperature of the composite microwires of the array 80. In such case, the detector 46 assigns the first detected pulse (in phase relationship) with the highest amplitude with a logic level "1" as the start bit (here depicted as microwire 83) and the last detected data microwire 86 with highest amplitude and with a logic level "0" as the stop bit. All data microwires between the start and stop bits 83 and 86 are detected by the microwire temperature reader/detector as data bits. The intervening data microwires can be used, as described in the first embodiment, for a variety of functions such as tag identification number and "class of object" code.

In order to decode the temperature information from sensor 64 using an example of a "Simple Decoding Algorithm," assume there are "N" composite microwires from the array 80 that have ferromagnetic sheaths 74 such that all of the respective sheaths 74 have Curie temperatures which are exceeded (or have regulation temperatures "near" the Curie temperatures) during the normal operating range of the sensor 64. The least significant bit of these N composite microwires 66, detected in phase relationship just after the stop bit 86, and at a specified phase relationship from the stop bit 86, is deemed the "first" composite microwire 89. Thus, the first composite microwire 89 will begin producing its normal short pulse perturbation only at temperatures above the Curie temperature of its sheath 74, and hence the detector 46 will only then detect its voltage pulse (bit). The first composite microwire 89 will not produce its normal short pulse perturbation below the Curie temperature of its sheath 74, and therefore its bit will either be missing from the bits detected by detector 46, or its pulse will be so altered as to be clearly detectable by the detector 46 as an "altered" microwire.

A "second" composite microwire 90 in phase relationship from the stop bit 86 (the next-to-least significant bit) has a ferromagnetic sheath 74 of slightly higher Curie temperature than that of the first composite microwire 89. The bit of composite microwire 90 will not be read by the detector 46 or its voltage signal will be detected as "altered" at temperatures below this higher sheath Curie temperature (or higher temperature near the sheath Curie temperature), but will appear as expected in phase and duration at a higher temperature than that of the first composite microwire 89.

Thus, if the sensor 64 is subjected to a temperature below that of the Curie temperatures (or designated temperatures below the Curie temperatures) of both the first and second composite microwires 89 and 90, no composite microwires will be detected by the detector 46 (assuming that all subsequent higher order composite microwires in array 80 have sheaths 74 with a higher Curie temperature). If the sensor 64 is subjected to a temperature above the sheath Curie temperature (or related temperature) of the first composite microwire 89 but below the sheath Curie temperature (or related temperature) of the second composite microwire 90, the first bit will be read by the detector 46 but the second bit will either still not be read by the detector 46 or will have an "altered" signal as read by the detector. Finally, if the sensor 64 is subjected to a temperature higher than the sheath Curie temperature (or related temperature) of both the first and second composite microwires 89 and 90, both the first and second composite microwires will be read by the detector 46.

The detector 46 contains a "Simple Decoding Algorithm" that recognizes that the appearance of the first temperature bit of first composite microwire 89, but the lack (or alteration of) of the second temperature bit of second composite microwire 90, and thus signals via display 56, that the sensor temperature exists somewhere between the first sheath Curie temperature and the second sheath Curie temperature. Thus, if the sensor 64 is placed in intimate thermal contact with an object whose temperature is of interest, then by reading the composite microwire array bit output of the sensor 64, the detector 46 determines the object's temperature within the temperature range defined by the interval between the first and second sheath Curie temperatures (or between their respective temperature near their Curie temperatures).

If the number of composite microwires 66 on the sensor 64 have sheath Curie temperatures known to be in increasing sequential order is increased to "N" composite microwires, and these sheath Curie temperatures are selected to be at least somewhat consistent in their increments from one another, the sensor 64 has detectable temperature range from the first to the $N^{th}$ sheath Curie temperatures, and has a temperature resolution defined by the increment between sequential sheath Curie temperatures.

More generally, the detector 46 decoding algorithm is built to understand that the appearance of the first through the $N-1^{th}$ temperature bits generated by the corresponding composite microwires 66 in their normal pulse state, together with the lack of the $N^{th}$ temperature bit corresponding to $N^{th}$ composite microwire 66 in its normal pulse state, establishes that the sensor temperature exists somewhere between the $N-1^{th}$ sheath Curie temperature and the $N^{th}$ sheath Curie temperature (or between their respective temperatures near the sheath Curie temperatures). The detector algorithm preferably reports this sensor temperature to be the midway temperature between $N-1^{th}$ and $N^{th}$ Curie temperatures.

Preferably, the acceptable composite microwire bit patterns and their corresponding sensor temperatures are stored in a look-up table within the memory of detector 46. Thus, when an acceptable bit pattern is detected by detector 46 from a correlated sensor 64, this pattern is compared against the look-up table to find the correlating sensor temperature. Again, both a "Simple Decoding Algorithm," or a "Complex Decoding Algorithm" may be employed by the reader, where the use of altered pulse information by a "Complex Decoding Algorithm" has been described earlier in this disclosure.

In cases where one or more composite microwires 66 of array 80 do not appear in their normal state in proper sequence with the others (due to a mis-read by the detector 46, a lack of thermal contact with the other composite microwires, or some other reason), the detector algorithm preferably attempts a re-read of the sensor 64. If continuous re-reads show the same anomalous bit pattern, the detector algorithm can discard the temperature data, use the last measured temperature (or the last measured temperature plus a delta temperature that is based upon a calculation involving the last measured rate of change of temperature and reading time interval), and then try again at the next scheduled read interval.

Third Embodiment

Microwires with Separate but Adjacent Ferromagnetic Saturation Elements for Temperature Sensing The third embodiment is conceptually very similar to the second embodiment and differs in the use of ferromagnetic sheath saturation or biasing elements as separate entities which do not need to touch the surface of the adjacent temperature-sensing microwires, as compared with the sheaths 74 of the second embodiment which are bonded or otherwise affixed to central microwire structure. Referring to FIG. 7, a combination microwire 92 is illustrated and includes a microwire 20 of the type previously described that has no intentional reduction of its Curie temperature, such that it will retain its large Barkhausen discontinuity and other magnetic properties as depicted in FIG. 2 throughout the entire operating range of the sensor. Also, the combination microwire 92 includes an adjacent ferromagnetic sheath 94. The sheath 94 is located near enough to the associated microwire 20 so as to prevent by magnetic saturation or biasing re-magnetization of the microwire 20 and consequent generation of its signature perturbation until the combination microwire 92 experiences a temperature above the Curie temperature (or above some temperature near the Curie temperature) of the sheath 94. Again, as in the case of the second embodiment, the sheath 94 can be designed so that the associated microwire 20 will exhibit a series of different re-magnetization responses below and above different set point temperatures below the sheath Curie temperature, and if desired such multiple different responses can be used for temperature sensing and determination.

In more detail, the sheath 94 is preferably in the form of a thin rectangular sheet of ferromagnetic metal whose size is not significantly wider than that of the associated microwire 20, and whose flat surface may be bent into a half-round shape (or, in the case Ferrite, may be sintered into a half-round or some other suitable shape). The Curie temperature of the shield 94 is carefully chosen so that the associated microwire 20 will produce its signal perturbation (and thus a re-magnetization pulse of voltage) when the combination microwire 92 is placed in an alternating magnetic field of the detector 46 and only when the combination microwire 92 experiences a temperature above the Curie temperature (or is detectible in a range of temperatures only above some fixed temperature near the Curie temperature) of the sheath 94. The sheaths 94 need only be microns thick or as thick as needed for saturation of the associated microwire 20, and for ease of manufacturing. The same types of alloys or Ferrites described in connection with the second embodiment may be used in the fabrication of sheath 94. Furthermore, magnetic inks (using either ferromagnetic powder or Ferrite powder) are also suitable and have the advantage of being printable on a supporting substrate for the combination microwires 92.

Referring to FIG. 8, a temperature sensor 96 is illustrated, which is in all respects identical with sensor 64, save for the use of combination microwires 92 in lieu of the composite microwires 66. Accordingly, like reference numerals from FIG. 6 are used in FIG. 8 to denote identical components, and an "a" designation has been used to distinguish the combination microwires 92 from the composite microwires 66. The operation of sensor 96 is identical to that of sensor 64, and makes use of a similar detector 46 having appropriate decoding algorithms (preferably look-up tables) correlated with the sensor 96. Accordingly, a detailed description of this operation is unnecessary.

Figure 4A:
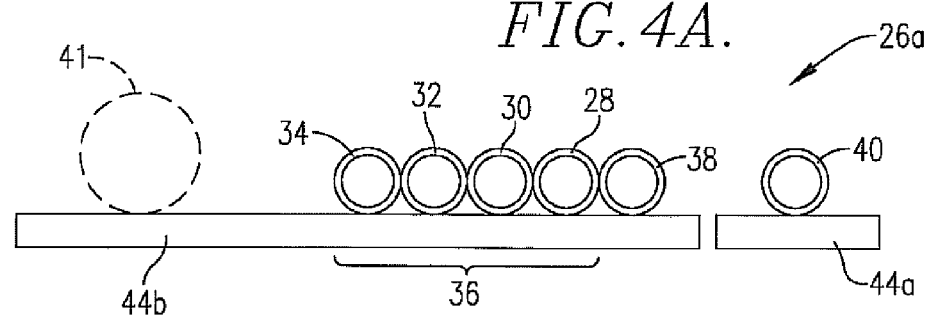
FIG. 4A is an essentially schematic cross-sectional view similar to that of FIG. 4, but illustrating the components of a magnetic microwire temperature sensor split between two objects designed for placement in proximity to each other.

The above-described three embodiments, and indeed other embodiments within the scope of the present invention, can be varied in a number of different respects. For example, FIG. 4A depicts an alternative arrangement advantageous for some product applications. Specifically, in FIG. 4A a sensor 26a is provided wherein the microwire data element 40 is attached to a first object 44a, whereas the remaining data microwire 38 and the temperature-sensing microwires 28-34, and optional bias element 41, are attached to a second object 44b. The bit logic of sensor 26a is identical with that of sensor 26, meaning that, even though the components of the sensor 26a are separated onto objects 44a and 44b, the overall sensor 26a will only operate when all of the sensor components are within the alternating magnetic field generated by detector 46. If this condition does not exist, then no successful reading using the detector 46 can occur. This construction can be used, for example, to control heating of a two-part object by a heater only if the heater's detector detects both part of the sensor (and thus both objects 44a and 44b), and to correspondingly prevent any heating unless both parts of the sensor are present and within the magnetic field of detector 46. In such a case the heater control would typically be coupled with the signal processing unit 54 of detector 46.

Of course, this same design concept may be used when more than two objects are present. Additionally, more sophisticated data encoding methods such as those described above may be used to correlate one or more pieces of the overall sensor 26a with matching pieces thereof. Such methods may include laser encoding the first data element 40, with a matching multi-bit code for stop data bit 38.

Although the FIG. 4A alternative has been described with reference to sensor 26 of the first embodiment, it will be appreciated that the same modification may be used with sensors 64 and 96 of the second and third embodiments if desired.

The microwires forming a part of the sensors 64 and 96, just as in the case of the microwires 20 of sensor 26, may be bound onto an object 44 or a thermally conductive substrate such as substrate 82 using an appropriate adhesive. In another alternative, the microwires 20, composite microwires 66 and/ or combination microwires 92 may be encased in very thin, non-ferromagnetic, thermally conductive material such as a graphite-filled polymer material that is compression or injection moldable, such as one within the family of materials sold by SGL Carbon under the designation RIDURID®. Other useable high-temperature materials include ceramic potting materials sold by Aremco under the designation Ceramamcast 510, or other flexible high-temperature polymers. With use of such materials the thickness and overall thermal mass of the encasing material should be kept to a minimum in order to minimize thermal lag between the object to be temperature monitored and the core alloy materials of the microwires.

Additionally, the microwires of the described embodiments may be twisted into a thread or woven into the structure of an object to be temperature-monitored if appropriate. For instance, the microwires may be woven into a carbon fabric cloth, so long as good thermal contact can be maintained and suitable art means are used to distinguish each temperature-changing element from each other and from each of the distinctly identified data elements (to include a stop bit).

Closed-Loop Feedback Autoclave, Oven, and Resin-Transfer Molding Systems for Composite Part Production The wireless magnetic element temperature sensors and associated detectors of this invention can easily be used in place of prior art wired thermocouples used in closed-loop feedback treatment apparatus such as autoclaves, ovens, resin-transfer molding systems, and vacuum-bag/heating systems used in repair processes.

Figure 11:
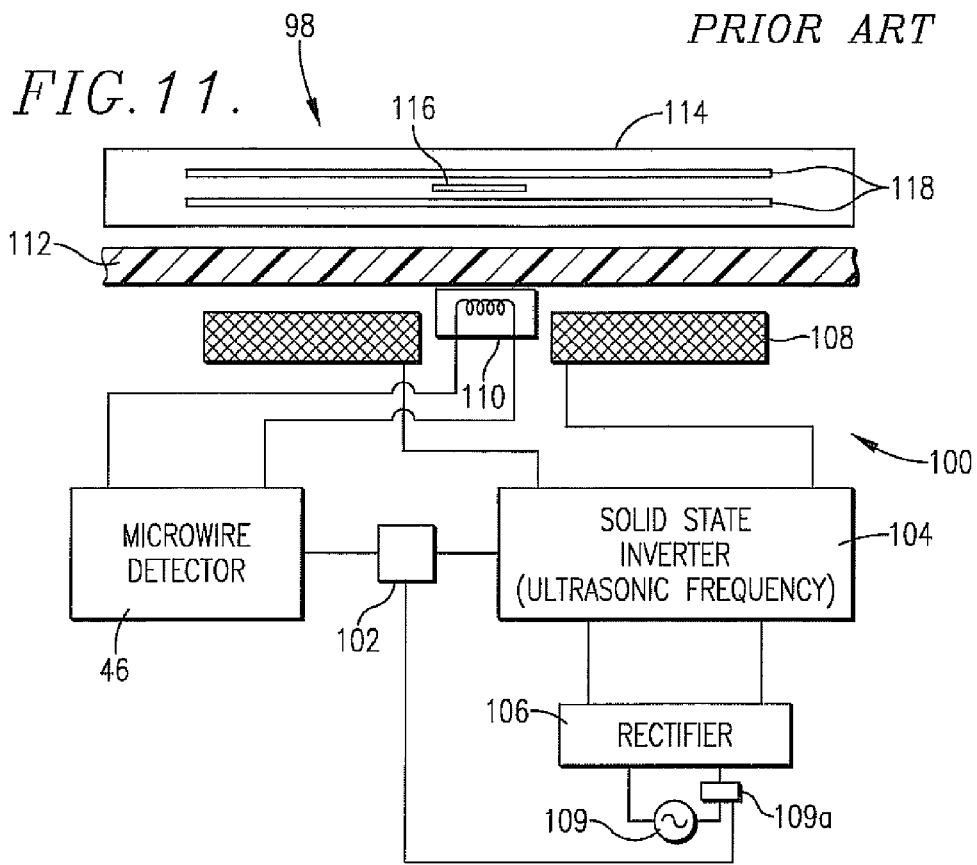
FIG. 11 is a schematic diagram illustrating magnetic element sensor-based, closed-feedback temperature control induction heating unit in accordance with the invention.

Referring to FIG. 11, a generic closed-loop heating system 98 includes a microwire detector 46 (see FIG. 10) incorporated into an induction heating device 100 in lieu of an RFID reader. The device 100 includes a control microprocessor 102 operably coupled with detector 46, solid state inverter 104, and rectifier 106, as well as an induction work coil 108 coupled to inverter 104. An AC power source 109 and current sensor 109a are operably coupled with rectifier 106. The field generator and receiving coils 50 and 52 are integrated into a sensor component 110 located beneath a support element 112.

The system 98 is designed to control the temperature of a graphite heating disk 114 such as described in U.S. Pat. No. 6,657,170 having on or more embedded microwire sensors 116 of the present invention. The disk 114 has graphite layers 118 above and below sensor 116 as shown. Of course, any other induction-heatable object can be controlled instead of the disk 114, such as a multiple-ply cooking utensil (pot or pan, for example) having one or more embedded sensors 116 therein. The feedback of temperature information from the sensor(s) 116 is detected by the detector 46 and this information can be used to control the induction heating of disk 114 via control microprocessor 102. Furthermore, any type of heating device or heating system, such as an oven, autoclave, or resin transfer molding press can take the place of the induction heater of this example, as long as the temperature information from the detector, 46, is being used by said heating device to control its output of energy.

Figure 12:
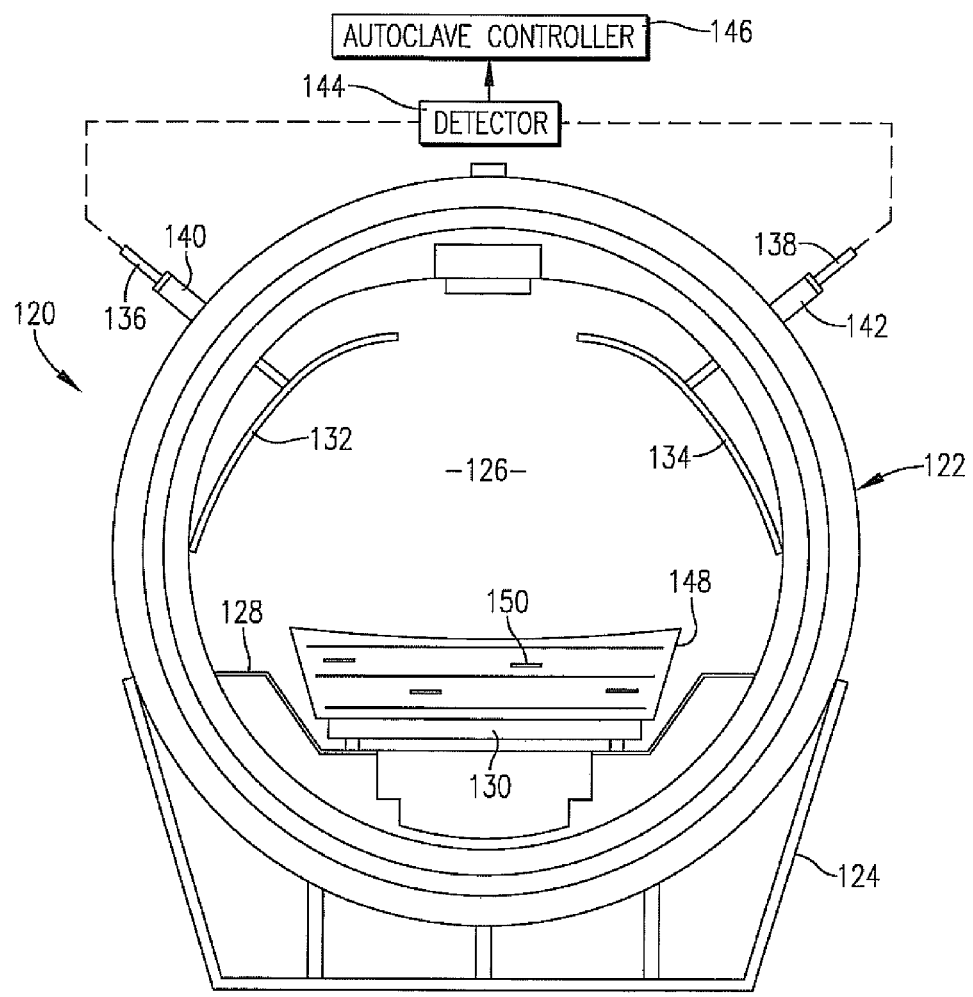
FIG. 12 is a schematic diagram illustrating an autoclave equipped with a closed-loop temperature feedback apparatus in accordance with the invention.

For example, in FIG. 12 an autoclave 120 is illustrated in its door-open condition. The autoclave 120 includes a thick-walled autoclave chamber 122 supported by a base 124. The chamber 122 has a circular back wall 126 and a similarly configured forward closure door (not shown). Internally, the autoclave chamber 122 is equipped with a mounting shelf 128 supporting a parts platform 130. Conventional steam inlets and heating elements (not shown) are provided with the chamber 122 in order to establish and maintain appropriate temperature and pressure conditions therein. Additionally, the autoclave 120 includes a pair of microwire reader antennas 132, 134 are located within chamber 122. The respective antennas 132, 134 are mounted on support rods 136, 138, the latter being axially adjustable by means of sealed slide mounts 140, 142. The antennas 132, 134 are operably connected with an external detector 144. The detector 144 is in turn operably coupled with an autoclave microprocessor controller 146 designed to control process temperatures within chamber 122.

A composite part 148 is located within chamber 122, and rests atop platform 130. The part 148 has a series of elongated, embedded microwire sensors 150 of the type previously described. Although not shown, it will be appreciated that the part 148 may also be located within a bag and base positioned within the autoclave chamber, so that vacuum condition may be established within the bag to eliminate voids in the finished part.

During treatment of part 148, the antennas 132, 134 are shifted to positions relative to part 148 allowing proper interrogation and reading of the sensors 150 as previously described. Of course, additional antennas could be used, and may be separated into transmitting antennas for generating an alternating interrogation field and corresponding detector antennas operable to detect the re-magnetization responses of the sensors 150. The detected temperature parameter information from the sensors 150 is used by the autoclave controller 146 to maintain appropriate temperature and pressure conditions within chamber 122 during the course of treatment of the part 148.

Figure 13:
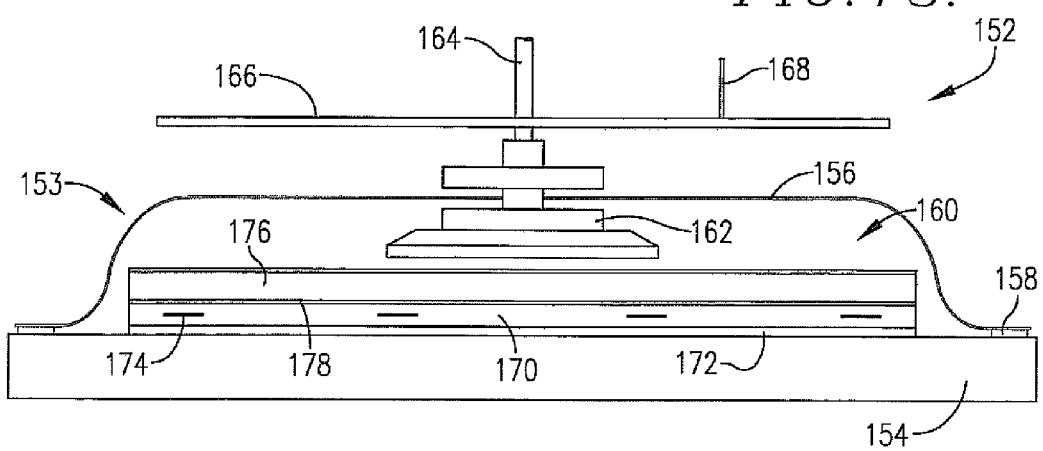
FIG. 13 is a schematic diagram illustrating a vacuum bag treatment chamber having portions (the reader antenna and sensors) of a closed-loop temperature feedback apparatus in accordance with the invention.

FIG. 13 illustrates a type of vacuum bagging apparatus 152. Such apparatus is typically used inside of an autoclave, oven or other closure, but, in a slightly modified form is used in repair processes. The apparatus 152 includes a chamber 153 made up of tooling base 154 (which, in a repair process is replaced by a section of the part itself) with a flexible sheet or cover 156 affixed to base 154 via peripheral seals 158. The base 154 and cover 156 cooperatively define an internal object treatment zone 160. A vacuum head 162 is located within zone 160 and extends outwardly through conduit 164 to a vacuum source (not shown). A microwire reader antenna 166 is positioned externally of cover 156 and is operably coupled via lead 168 to a detector (not shown).

In the illustrated embodiment, a part 170 is supported on base 154, with an optional, intermediate release layer 172 between the underside of 170 and base 154. The part 170 has a plurality of elongated microwire sensors 174 embedded therein. A breather 176 is positioned atop part 170, with a peel layer 178 there between.

In use, temperature and vacuum conditions within the zone 160 are established and maintained by various means, such as by heating of base 154 and vacuumization by head 162. During a treatment cycle, the antenna 166 interrogates the sensors 174 by generation of an appropriate alternating magnetic field, and the re-magnetization responses of the sensors 174 are detected. Such detected information is then used by the overall microprocessor controller for the apparatus 152 for process control purposes or is used to simply monitor the temperature of the part for manual or prior-art control of the heating.

Each of the patents and literature references mentioned herein are specifically and fully incorporated by reference into this disclosure.

I claim:

1. A method of measuring the temperature of an object using a temperature sensor operably coupled with said object, said sensor including a plurality of magnetically susceptible microwire temperature sensing elements each having a temperature-sensitive re-magnetization response under the influence of an applied magnetic field, wherein each re-magnetization response is defined by at least one short, detectible pulse of magnetic field perturbation of defined duration which is correlated with the temperature of said object and is different below and above at least one set point temperature below about 400° C., at least certain of the sensing elements having a different set point temperature than other of the sensing elements, and wherein said detectible pulses change in detectible properties through a range of temperatures below the respective Curie Temperatures of said sensing elements, said method comprising the steps of:
   generating an alternating magnetic field in the region of the temperature sensor;
   detecting a first re-magnetization response of a first sensing element from said plurality of sensing elements as a first voltage pulse, and detecting a second re-magnetization response of a second sensing element from said plurality of sensing elements, as a second voltage pulse, and integrating the first and second voltage pulses over the elapsed time thereof to generate first and second detected values, and
   determining the temperature of said object by using said first and second detected values.

2. The method of claim 1, said set point temperatures of said first and second sensing elements being the Curie of Temperatures thereof.

3. A method of measuring the temperature of an object using a temperature sensor operably coupled with said object, said sensor including first and second magnetically susceptible microwire temperature sensing elements each having a re-magnetization response under the influence of an applied magnetic field, wherein each re-magnetization response is defined by at least one short, detectible pulse of magnetic field perturbation of defined duration and being different below and above at least one set point temperature below about 400° C., and wherein said detectible pulses change in detectible properties through a range of temperatures below the Curie Temperatures of said sensing elements, said method comprising the steps of:
   generating an alternating magnetic field in the region of said first and second temperature sensing elements;
   detecting a first re-magnetization response of said first sensing element as a first voltage pulse, detecting a second re-magnetization response of said second sensing element as a second voltage pulse, and integrating said first and second voltage pulses over the elapsed times thereof to generate first and second detected values; and
   determining the temperature of said object by using said first and second detected values.

\* \* \* \* \*